(12) United States Patent
Maria

(10) Patent No.: US 11,451,978 B2
(45) Date of Patent: *Sep. 20, 2022

(54) HYPERVISOR FOR ACCESS POINTS AND EDGE NODES

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/535,427

(22) Filed: Aug. 8, 2019

(65) Prior Publication Data

US 2019/0394656 A1    Dec. 26, 2019

Related U.S. Application Data

(63) Continuation of application No. 15/445,209, filed on Feb. 28, 2017, now Pat. No. 10,412,603.

(51) Int. Cl.
| | |
|---|---|
| G01R 31/08 | (2020.01) |
| G06F 11/00 | (2006.01) |
| G08C 15/00 | (2006.01) |
| H04J 1/16 | (2006.01) |
| H04J 3/14 | (2006.01) |

(Continued)

(52) U.S. Cl.
CPC ........ *H04W 24/02* (2013.01); *G06F 9/45533* (2013.01); *H04L 41/0816* (2013.01); *H04L 41/0859* (2013.01); *H04L 41/147* (2013.01); *H04L 43/0817* (2013.01); *H04W 36/385* (2013.01); *H04W 76/12* (2018.02); *H04W 16/14* (2013.01); *H04W 88/085* (2013.01)

(58) Field of Classification Search
CPC ... H04W 24/02; H04W 76/12; H04W 36/385; H04W 16/14; H04W 88/085; G06F 9/45533; H04L 41/0816; H04L 41/0859; H04L 41/147; H04L 43/0859
See application file for complete search history.

(56) References Cited

U.S. PATENT DOCUMENTS

| | | | | |
|---|---|---|---|---|
| 6,125,105 A | * | 9/2000 | Edwards | H04L 43/0876 370/255 |
| 6,208,640 B1 | * | 3/2001 | Spell | H04Q 11/0457 370/468 |

(Continued)

FOREIGN PATENT DOCUMENTS

| | | |
|---|---|---|
| EP | 2866495 A2 | 4/2015 |
| EP | 2223556 B1 | 4/2016 |

(Continued)

OTHER PUBLICATIONS

Zaki et al.; "LTE Wireless Virtualization and Spectrum Management"; IEEE Third Joint IFIP Wireless and Mobile Networking Conference; 2010; 6 pages.

(Continued)

*Primary Examiner* — Stephen M D Agosta
(74) *Attorney, Agent, or Firm* — Guntin & Gust, PLC; Douglas Schnabel

(57) ABSTRACT

Systems and methods include a hypervisor for access points, edge nodes, and other network elements to facilitate use of and compatibility with shared access systems.

17 Claims, 11 Drawing Sheets

(51) Int. Cl.

| | |
|---|---|
| *H04L 1/00* | (2006.01) |
| *H04L 12/26* | (2006.01) |
| *H04W 24/02* | (2009.01) |
| *H04L 41/0816* | (2022.01) |
| *G06F 9/455* | (2018.01) |
| *H04L 41/0859* | (2022.01) |
| *H04L 41/147* | (2022.01) |
| *H04L 43/0817* | (2022.01) |
| *H04W 36/38* | (2009.01) |
| *H04W 76/12* | (2018.01) |
| *H04W 16/14* | (2009.01) |
| *H04W 88/08* | (2009.01) |

(56) References Cited

U.S. PATENT DOCUMENTS

| | | | | |
|---|---|---|---|---|
| 6,886,043 | B1* | 4/2005 | Mauger | H04L 45/50 |
| | | | | 370/392 |
| 8,170,577 | B2 | 5/2012 | Singh | |
| 8,565,203 | B2 | 10/2013 | Ghosh | |
| 8,577,406 | B2 | 11/2013 | Sawai et al. | |
| 8,615,250 | B2 | 12/2013 | Xing | |
| 8,874,125 | B2 | 10/2014 | Mahindra et al. | |
| 8,891,455 | B2 | 11/2014 | Cleveland et al. | |
| 8,923,875 | B2 | 12/2014 | Frederiksen et al. | |
| 8,964,685 | B2 | 2/2015 | Smith et al. | |
| 9,094,899 | B2* | 7/2015 | Smith | H04W 48/17 |
| 9,131,072 | B1* | 9/2015 | Kakadia | H04M 15/805 |
| 9,224,169 | B2* | 12/2015 | Smith | H04W 72/04 |
| 9,226,193 | B2* | 12/2015 | Smith | H04W 8/02 |
| 9,311,160 | B2 | 4/2016 | Parker | |
| 9,357,399 | B2* | 5/2016 | Kwon | H04W 24/02 |
| 2001/0039582 | A1* | 11/2001 | McKinnon, III | H04L 47/263 |
| | | | | 709/224 |
| 2006/0120282 | A1* | 6/2006 | Carlson | H04L 43/062 |
| | | | | 370/431 |
| 2007/0002743 | A1* | 1/2007 | Fan | H04W 28/20 |
| | | | | 370/235 |
| 2007/0149187 | A1* | 6/2007 | Levy | H04L 5/0007 |
| | | | | 455/425 |
| 2008/0273591 | A1* | 11/2008 | Brooks | H04N 21/6373 |
| | | | | 375/240.01 |
| 2009/0059856 | A1* | 3/2009 | Kermoal | H04W 16/14 |
| | | | | 370/329 |
| 2011/0125905 | A1 | 5/2011 | Baucke et al. | |
| 2012/0064893 | A1* | 3/2012 | Reagor | H04W 24/02 |
| | | | | 455/436 |
| 2012/0120887 | A1* | 5/2012 | Deaton | H04W 16/14 |
| | | | | 370/329 |
| 2012/0317270 | A1 | 12/2012 | Vrbaski et al. | |
| 2013/0142100 | A1* | 6/2013 | Vrzic | H04W 4/06 |
| | | | | 370/312 |
| 2013/0159494 | A1* | 6/2013 | Dan | H04L 41/147 |
| | | | | 709/224 |
| 2014/0229945 | A1 | 8/2014 | Barkai et al. | |
| 2014/0310707 | A1 | 10/2014 | Rajan et al. | |
| 2014/0357218 | A1 | 12/2014 | Andrianov et al. | |
| 2015/0043915 | A1 | 2/2015 | Patel et al. | |
| 2015/0098412 | A1* | 4/2015 | Yerramalli | H04W 74/0808 |
| | | | | 370/329 |
| 2015/0124740 | A1 | 5/2015 | Chen et al. | |
| 2015/0181589 | A1 | 6/2015 | Luo et al. | |
| 2016/0037550 | A1 | 2/2016 | Barabell et al. | |
| 2016/0081124 | A1 | 3/2016 | Yang et al. | |
| 2016/0094318 | A1 | 3/2016 | Sattil | |
| 2016/0197846 | A1* | 7/2016 | Bernstein | H04B 3/00 |
| | | | | 375/222 |
| 2016/0219076 | A1 | 7/2016 | Paczkowski et al. | |
| 2016/0249223 | A1* | 8/2016 | Egner | H04W 16/14 |
| 2016/0328259 | A1* | 11/2016 | Xia | H04L 41/28 |
| 2016/0330736 | A1 | 11/2016 | Polehn et al. | |
| 2017/0086077 | A1* | 3/2017 | Teng | H04W 16/14 |
| 2017/0102447 | A1* | 4/2017 | Choi | H04W 56/005 |
| 2018/0115652 | A1* | 4/2018 | Russell | G06Q 50/188 |

FOREIGN PATENT DOCUMENTS

| | | |
|---|---|---|
| WO | WO 2014/056907 A2 | 4/2014 |
| WO | WO 2016/195751 A1 | 12/2016 |

OTHER PUBLICATIONS

Costa-Perez et al.; "Radio Access Network Virtualization for Future Mobile Carrier Networks"; IEEE Communications Magazine; Jul. 2013; p. 27-35.

Liang et al.; "Wireless Virtualization for Next Generation Mobile Cellular Networks"; IEEE Wireless Communications; Feb. 2015; p. 61-69.

Wang et al.; "Wireless Network Virtualization"; Journal of Communications; vol. 8 No. 5; May 2013; p. 337-344.

Zhao et al.; "LTE Virtualization: from Theoretical Gain to Practical Solution"; Proceedings of the 23$^{rd}$ Int'l Teletraffic Congress; 2011; p. 71-78.

\* cited by examiner

HYPERVISOR FOR ACCESS POINTS AND EDGE NODES

CROSS-REFERENCE TO RELATED APPLICATIONS

This patent application claims priority to, and is a continuation of, copending U.S. patent application Ser. No. 15/445,209, filed Feb. 28, 2017, the entirety of which is incorporated herein by reference in its entirety.

TECHNICAL FIELD

This disclosure relates generally to network management and, more specifically, to assigning and configuring networks and network elements to support shared access systems.

BACKGROUND

Certain regulating bodies, such as national governments, regulate the use of various signal frequencies and blocks of frequencies as spectrums. However, as use of wireless communication techniques continues to grow, efficient utilization of spectrums is becoming increasingly important to provide a sufficient spectrum of frequencies to support the general public.

Some regulated spectrums of frequencies are (or were at one time) dedicated specifically for governmental use only. For example, some frequencies are reserved or restricted for use by governmental users for applications such as radar, radios, et cetera. However, in order to maximize spectrum utilization, some of these spectrums may be conditionally available to non-regulated users.

Accordingly, systems are needed to observe and support the regulated systems, which will be provide interoperability with legacy connectivity systems.

SUMMARY

In embodiments, a system comprises an access point communication module configured to communicate with two or more access points and a shared access communication module configured to communicate with a network element configured to provide changes to shared access system data to the access point communication module. The system further comprises a logging module that creates a log including the changes to the shared access system data and a shared access processing module configured to transmit, to at least one access point of the two or more access points, an access point command based on the changes to the shared access system data in response to determining that the at least one access point is impacted by the changes to the shared access system data based on the changes to the shared access system data and operating parameters of the at least one access point.

In embodiments, a method comprises receiving changes to shared access system data from a network element at an access point shared access system manager in communication with two or more access points, the network element in communication with a shared access system element. The method further comprises creating a log including the changes to the shared access system data and determining that at least one access point among the two or more access points is impacted by the changes to the shared access system data based on the changes to the shared access system data and operating parameters of the at least one access point. The method further comprises modifying, in response to determining that the at least one access point is impacted by the changes, the at least one access point in accordance with the changes.

In embodiments, a system comprises a computer-readable medium storing instructions. The instructions, when executed by a processor, effectuate operations comprising receiving changes to shared access system data, creating a log including changes in the changes to the shared access system data, determining at least one access point among two or more access points is impacted by the changes, and generating, in response to determining that the at least one access point is impacted by the changes to the shared access system data, an access point command based on the changes to the shared access system data, as well as transmitting the access point command to the at least one access point.

These and other embodiments are described in greater detail elsewhere herein.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
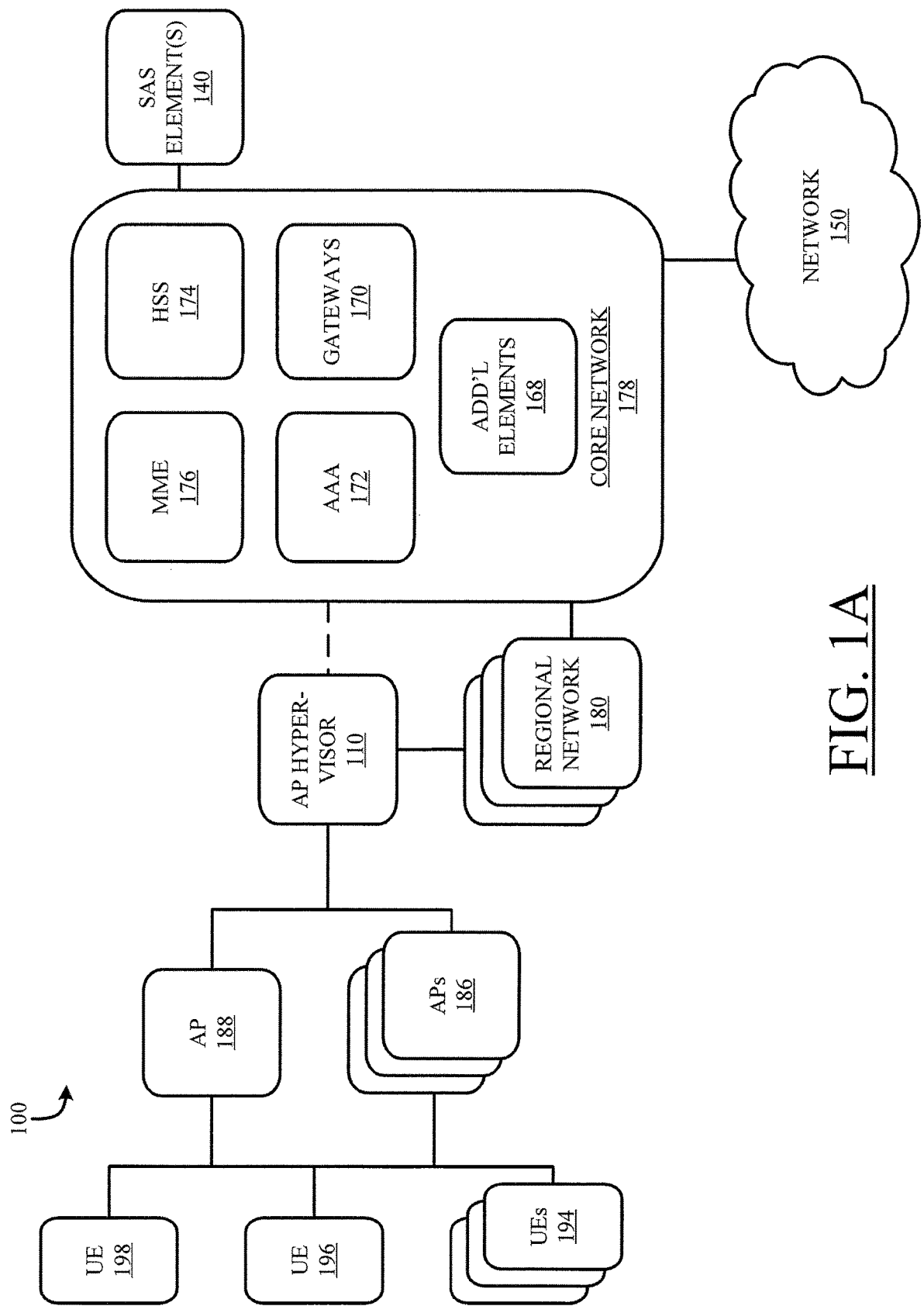
FIG. 1A illustrates a block diagram of an example network employing aspects of the disclosure herein.

Aspects herein are directed to a hypervisor for managing edge nodes and access points, such as eNodeBs, in conjunction with shared access systems for conditional use of regulated frequency spectrums. While eNodeBs are most frequently discussed as examples of access points throughout herein, it is understood that other access points, edge nodes, base station transceivers, et cetera, which can but need not be partly or wholly virtualized, can be used in conjunction with aspects herein. Further, while aspects herein may be described as a "hypervisor," it is understood various alternative management elements for managing virtual or physical network elements can be utilized without departing from the scope or spirit of the innovation.

An eNodeB, or E-UTRAN (Evolved UMTS (Universal Mobile Telecommunications System) Terrestrial Radio Access Network) Node B is an element in wireless networks that communicates directly with mobile devices connecting to a wireless network. Current eNodeBs and other access points for wireless connectivity operate in assigned frequencies licensed to carrier operators. These access points are typically provided as dedicated hardware running software for facilitating connections and operation of user equipment to carrier networks. The connection between user equipment and the access point is wireless, and the connection between the access point and core network is typically carried using high speed lines (e.g., fiber, 100 Gigabit Ethernet, et cetera).

Assigned frequencies are not an indefinite and immovable arrangement, and access points will operate only partially in pre-assigned and full-time licensed frequencies. Future wireless radio access network interfaces will include "shared spectrum." Governmental entities are expected to allow some or all of spectrums currently dedicated to military incumbents to new users. However, the military may still require exclusive use of these spectrums or portions thereof to maintain security and operational feasibility. Therefore, sharing may be contingent upon a variety of conditions, such as allowing access to non-utilized portions of a spectrum or limiting use to particular times.

Moving toward such shared spectrum solutions, in 2015 the Federal Communications Commission (FCC) published an order making available 150 MHz of spectrum in the 3.5 Ghz band. However, the FCC stipulated that the only way that his spectrum could be used would be with a Shared Access System (or "SAS") implementation technologies. Thus the FCC envisioned a shared access system that would inform carriers and general users of frequency changes in response to military incumbent's requirements. The SAS may receive this information from, e.g., Environmental Sensing Capabilities or Spectrum Resource Managers or various other sources (such as a third-party or military-run shared access system element of a network).

To support shared spectrum, eNodeBs and other access points will be responsive to changes in available frequencies. Access points will support licensed frequencies and as well as conditionally support shared frequencies according to Shared Access System (SAS) element input. The SAS elements will communicate a frequency allocation change or other information to the access point (either directly or through intervening network elements) so that the access point can in turn change frequencies and communicate the new frequency assignment to connected user equipment. These access points can be implemented as dedicated specialized hardware or software, as individual units or virtualized instances allowing multiple access points to run on a single node or distributed across multiple nodes.

An access point shared spectrum hypervisor can be used to manage these shared spectrum access points. In embodiments, the hypervisor can include or be a virtual machine manager. With respect to managing virtual machines, the hypervisor permits multiple operating systems to share a single hardware host. Each operating system may appear to have its host's processor, memory, and other resources all to itself. This disclosure proposes the use of a hypervisor specifically designed to support multiple eNodeBs (or other shared spectrum access points) residing in one processor. The hypervisor may communicate with upstream network elements (regional network elements, core network elements) or others communicatively coupled with the SAS elements providing frequency information or other shared access system data to manage associated access points.

While aspects hereafter illustrate example computing environments, it is understood that non-standard computing hardware and computer science assets are used in conjunction with the innovation. Use of specialized interfaces to SAS data sources, access points, and various network elements, coupled with dynamic security filters and firewalls to protect both the SAS data source(s) and core and regional network elements, means that environment-specific hardware and code will be employed for implementation of many aspects.

Turning to the drawings, FIG. 1A illustrates example system 100 for connecting users to network 150 in accordance with aspects herein. System 100 as illustrated includes a plurality of user equipment 198, 196, 194, which can connect to one of a plurality of access points 188 and 186. Access points 188 provide connectivity to one of plurality of regional networks 180 and 182, or in alternative or complementary embodiments may connected directly to core network 178. Regional networks 180 and 182 connect to core network 178. Core network 178 can provide connectivity to network 150, which can be the Internet or other networks outside the carrier network of core network 178. In alternative or complementary embodiments, some of plurality of regional networks 180 and 182 can also connect to non-carrier networks.

Core network 178 includes a variety of network elements such as mobility management entity 176, home subscriber server 174, authentication, authorization, and accounting server 172, various gateways 170 (for providing connectivity and services as well as network administration), and a variety of additional elements 168 to provide core network environment functionality or proprietary capabilities. Similar network elements may also exist in, e.g., regional network(s) 180.

In system 100, elements are configured to support shared access frequency functionality. In this regard, access point shared access system hypervisor 110 is provided for management and monitoring of access points 188 and 186. While access point shared access system hypervisor 110 is shown downstream of regional network 180 and upstream of access points 188 and 186, it is understood that access point shared access system hypervisor 110 may be hosted in a variety of physical or logical locations and need not be implemented as illustrated. In an embodiment, one or more of access points 188 and 186 is hosted in or by access point shared access system hypervisor 110, and thus these elements may be illustrated alternatively or complementarily in common blocks of a block diagram or elsewhere. In embodiments, two or more access point shared access system hypervisors 110 can exist in system 100.

Access point shared access system hypervisor 110 can receive a variety of inputs in managing portions of system 100 including access points 188 and 186. In the embodiment illustrated, shared access system elements 140 and sensor module 142 exist outside core network 178 but can interact with, e.g., elements of core network 178 (or, alternatively, regional network 180) to provide shared access system data and allow access point shared access system hypervisor 110 to manage at least access points 188 and 186 based on information received from shared access system elements 140. Shared access system elements can be any number of systems or network elements for facilitating shared spectrum by providing usage requirements or scheduling related to shared spectrum frequencies, or sensing frequency usage by priority incumbents.

Figure 1B:
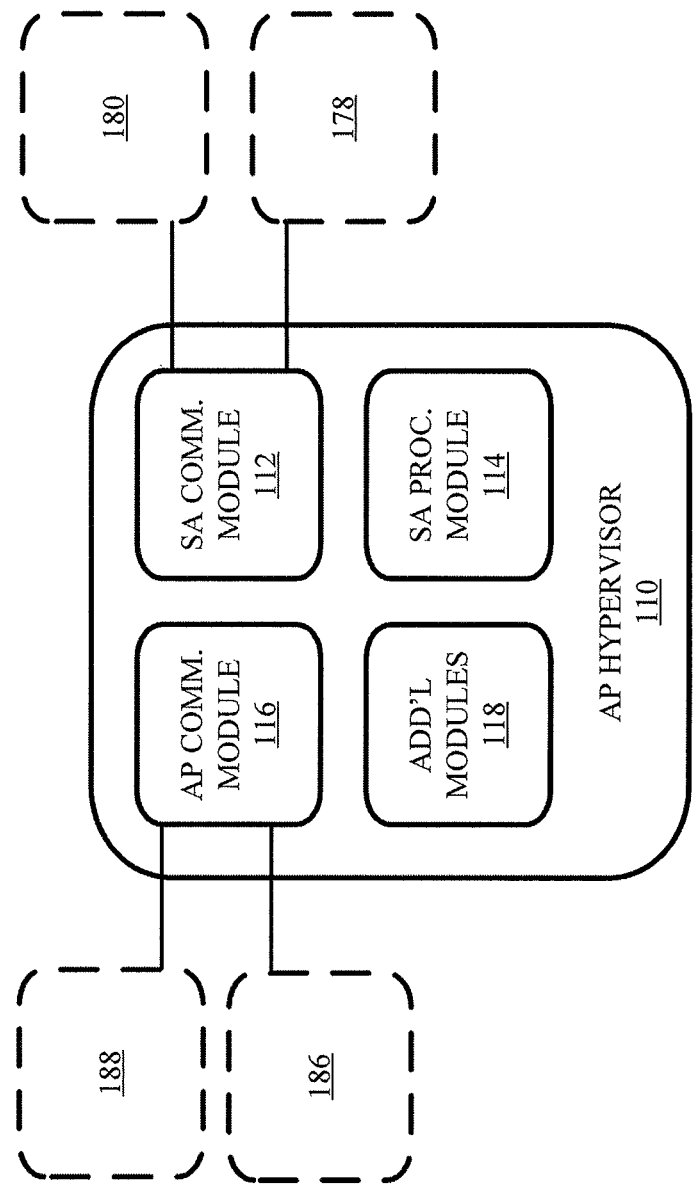
FIG. 1B illustrates a block diagram of an example access point hypervisor utilized with the network of FIG. 1A and other aspects herein.

FIG. 1B illustrates a more particularized view of access point shared access system hypervisor 110. Access point shared access system hypervisor 110 is communicatively coupled to regional network 180 and/or core network 178, from which it can receive shared access system data (including, but not limited to, frequency usage or changes within a shared spectrum). By routing shared access system data—which is received from elements outside the carrier network—through core network 178 and/or regional network 180, security can be preserved by shielding access point shared access system hypervisor 110, access points 188 and 186 (e.g., eNodeBs), and user equipment 198, 196, and 194 from external entities, and vice versa.

Access point shared access system hypervisor 110 can include a shared access communication module 112, a shared access processing module 114, an access point communication module 116, and, in embodiments, additional modules 118. Communication to core network 178 and/or regional network 180, or portions thereof concerning the transmission and reception of shared access system data, can be handled by shared access communication module 112. In particular, shared access communication module 112 can communicate with a core or regional network element that is configured to receive shared access system data and provide the shared access system data to shared access communication module 112. As discussed, the shared access system data includes, but is not limited to, shared access system frequency change information.

Shared access processing module 114 thereafter generates an access point command by analyzing the shared access system data, the access point command transmitted to the access point. Analysis of the shared access system data can include interpretation, application of rules, discerning or translating instructions, et cetera, to facilitate use by elements communicatively coupled to shared access processing module 114. The access point command can include, but is not limited to, instructions for one or more of changing an access point frequency, assigning or removing resources for the access point, and handing over user equipment to a different access point.

In embodiments, the access points (e.g., access points 186 or 188) are a virtualized access point instance. As such, access points 186 or 188 can be created, destroyed, or modified on demand. In embodiments, the access point command includes instructions for creating or destroying the virtualized access point instance. Nonetheless, in complementary embodiments, the access point shared access system hypervisor is interoperable with additional non-virtualized access points (e.g., legacy access points).

In embodiments, shared access processing module 114 or other elements of access point shared access system hypervisor 110 can determine one or more access points among access points 186 and 188 that are impacted by the shared access system data. This can include requirements for configuration changes including, but not limited to, frequencies on which the access point transmits or receives based on the shared access system data.

Access point communication module 116 can transmit information from access point shared access system hypervisor 110, including but not limited to the access point command, to one or more access points. Information provided using access point communication module 116 can be transmitted selectively to identified access points 186 and 188, or passed to all connected access points to allow access points 186 and 188 to determine if they are impacted or how to handle the information.

In embodiments, additional modules 118 can facilitate logging. For example, access point shared access system hypervisor 110 can create a log including changes in the shared access system data. In embodiments, access point shared access system hypervisor further analyzes the log to produce a change trend, the access point shared access system hypervisor further predicts a subsequent change in the shared access system data based at least in part on the change trend. Network conditions or contextual information such as traffic, time of day or date, maintenance, et cetera, can be factored into this analysis as well.

In embodiments, additional modules 118 can include a configuration engine of access point shared access system hypervisor 110. The configuration engine can configure the access point. This can include, e.g., setting security of the access point.

In embodiments, additional modules 118 can include a usage engine that tracks a capacity and/or usage of one or more access points. This information can be used for, e.g., creation or destruction of virtualized instances to manage capacity or achieve desired utilization metrics.

In embodiments, additional modules 118 can include various interfaces. Interfaces of access point shared access system hypervisor 110 can include an interface to one or more of an antenna, a radio head, and a connectivity element. Connectivity elements can include, e.g., a smart integrated access device (SIAD).

Figure 2:
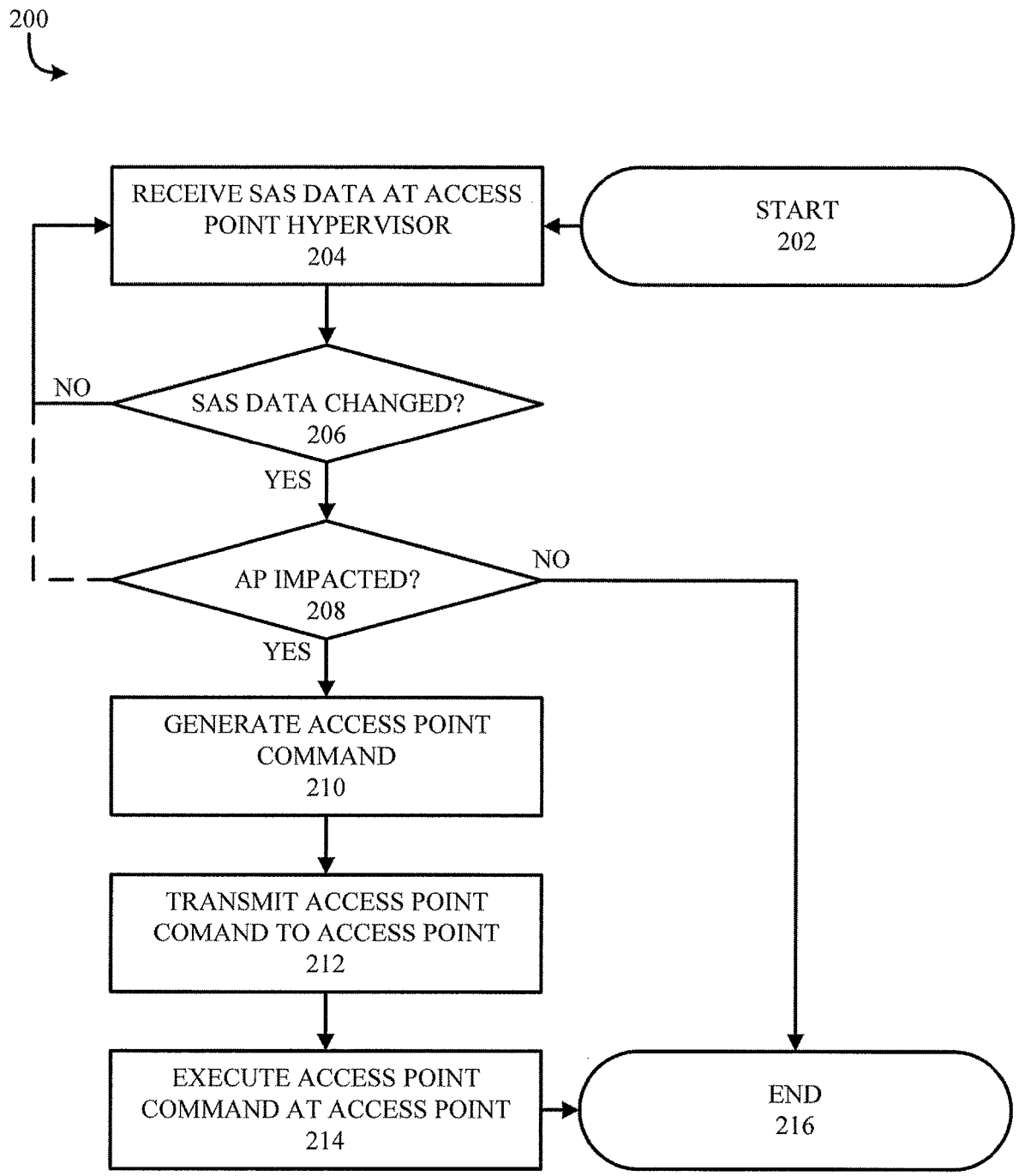
FIG. 2 illustrates a block diagram of an example methodology utilizing an access point hypervisor disclosed herein.

FIG. 2 illustrates a block diagram of an example methodology 200 for managing access points and other network elements using shared access system data. Methodology 200 begins at 202 and proceeds to 204 where shared access system data is received at an access point shared access system hypervisor. This shared access system data can be received from, e.g., one or more regional or core network elements communicatively coupled with shared access system elements.

At 206 a determination can be made as to whether the shared access system data has changed. Changes can include, e.g., current or projected use of shared spectrum frequencies, current or projected availability of shared spectrum frequencies, and others. If the shared access system has not changed as indicated by the determination at 206 returning negative, methodology 200 can recycle to 204 where additional shared access system data is received or awaited to manage shared access system frequencies throughout core or regional networks.

If the determination at 206 returns positive, methodology 200 proceeds to 208 where a determination is made as to whether any access points (e.g., eNodeBs) related to the network element hypervisor are impacted by the change. If the determination at 208 returns negative, methodology 200 may proceed to end at 216, or alternatively recycle to 204 where additional shared access system data is received or awaited to manage shared access system frequencies used by access points within the network.

If the determination at 208 returns positive, an access point command is generated at 210. The access point command can at least provide a command for one or more access points impacted by the change to shared access system data to ensure the access point configuration or operation complies with shared access system parameters.

At 212, the network command generated at 210 is transmitted to the access points. Thereafter, at 214, in embodiments the access point command is executed to effectuate the intended changes. At 216, methodology 200 ends, or may recycle to 204 to receive or await further shared access system data.

Methodology 200 is illustrated for ease of understanding but should not be deemed limiting. Additional aspects can be included, or aspects excluded, without departing from the scope or spirit of the innovation. Various other methodologies can be implemented according to the disclosures herein.

For example, a method can comprise receiving shared access system data from a core or regional network element at an access point shared access system hypervisor. The core or regional network element can be in communication with a shared access system element, and the shared access system data can include changes to available frequency bands in a shared access spectrum. The method can further include generating an access point command by analyzing the shared access system data at the access point shared access system hypervisor and transmitting the access point command to an access point.

In further embodiments, methods can include determining the access point is impacted (or additional access points that are impacted) by the changes to the available frequency bands in the shared access spectrum. In embodiments, the access point command instructs a frequency change to comply with the shared access system data.

In further embodiments, the access point is a virtualized instance of an access point. Embodiments of the method can include creating or destroying the virtualized instance of the access point.

In embodiments, a method can include monitoring capacity and utilization of the access point.

In embodiments, acknowledgements can be sent from access points to hypervisors to ensure access point commands or other transmissions are received and/or executed. In additional embodiments, access points can report to hypervisors with information received from outside the hypervisor to ensure information is disseminated among the network, and properly processed and actioned.

Various implementations can utilize a variety of different options for deploying access points and management entities for access points which are compliant with shared spectrum technology. In particular embodiments, the access point shared access system hypervisor runs in an architecture supporting eNodeB processors and functionality rather than in a general computing platform. The hypervisor can host or support existing access points residing on or embodied in dedicated hardware (e.g., legacy cell tower eNodeB) as well as virtualized instances of access points, allowing interoperability and full support for shared spectrum. In embodiments, hardware can be developed for performance of one or more virtualized eNodeBs.

In embodiments, the hypervisor can include specialized interfaces to other hardware components which interact with or support access points such as eNodeBs. For example, interfaces to antennas, radio heads, connectivity elements (e.g., smart integrated access devices (SIADS)), and others can be included in the access point shared access system hypervisor. The hypervisor can include microcode to facilitate communication between SAS elements or other upstream network elements through which SAS elements provide information to eNodeBs.

In an embodiment, when a frequency allocation change is communicated by the SAS network elements, the hypervisor can determine (e.g., by analysis, artificial intelligence, data processing) which hosted access points are affected and the manner and timing for communicating and implementing the frequency change. The hypervisor can also keep of a log of frequency changes for access points which can be used for audit and security purposes. In addition, the hypervisor can analyze previous frequency allocation changes and predict future changes to the hosted access points.

In embodiments, the hypervisor can create virtual instances of access points on demand in order to satisfy capacity constraints or frequency allocation changes. The hypervisor can include firewalls or other security modules to front-end virtual instances of access points created or managed.

The hypervisor can interface with core network elements or regional network elements in contact with SAS elements, thereby providing two-way security from the carrier network on behalf of SAS elements and for the carrier network against outside entities such as SAS elements. To interact with various network elements, the access point shared access system hypervisor can include specialized application programming interfaces (APIs) or API commands, which can be within the access point shared access system hypervisor to allow other entities to query its information, or be in other network elements with compatible queries or commands included within the hypervisor.

The hypervisor can enable remote configuration and security of access points hosted or managed by the hypervisor. User equipment switching or handover between access points can be handled, managed, or forced by the hypervisor. This can be based on various constraints related to the access points, shared access system data, et cetera. The hypervisor can include a tracking module to monitor access points it hosts or manages, monitoring, e.g., capacity and utilization of its access points.

FIGS. 3-10 show a variety of aspects used in conjunction with or providing context for the hypervisor and other elements. Particularly, FIG. 3 describes virtualization in the context of instances described above, and FIGS. 4-10 show various computing and network environments with which aspects herein are compatible.

Figure 3:
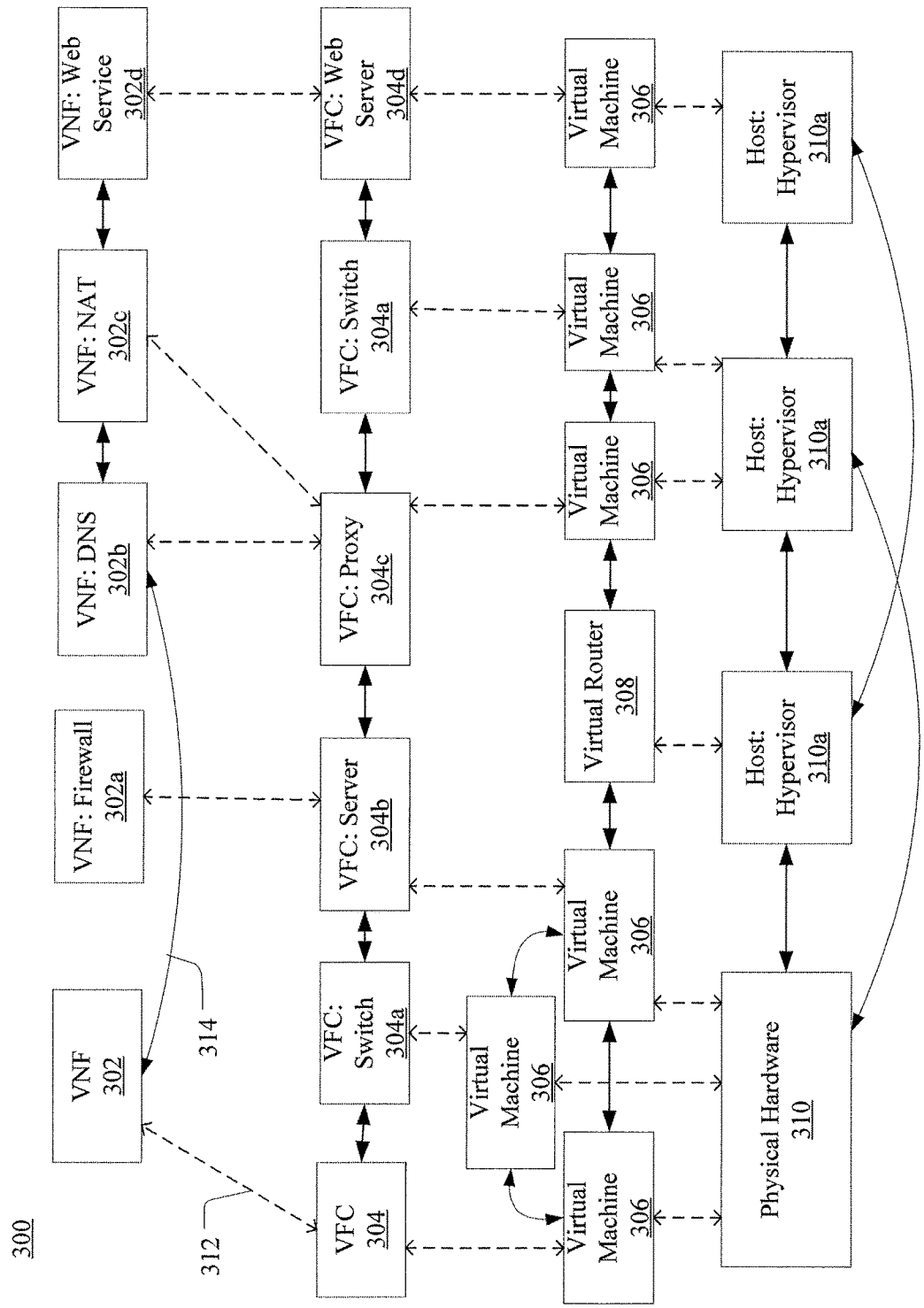
FIG. 3 is a representation of an example network.

FIG. 3 is a representation of an example network 300. Network 300 may comprise an SDN. Network 300 may include one or more virtualized functions implemented on general purpose hardware, such as in lieu of having dedicated hardware for every network function. General purpose hardware of network 300 may be configured to run virtual network elements to support communication services, such as mobility services, including consumer services and enterprise services. These services may be provided or measured in sessions.

A virtual network functions (VNFs) 302 may be able to support a limited number of sessions. Each VNF 302 may have a VNF type that indicates its functionality or role. For example, FIG. 3 illustrates a gateway VNF 302a and a policy and charging rules function (PCRF) VNF 302b. Additionally or alternatively, VNFs 302 may include other types of VNFs. Each VNF 302 may use one or more virtual machines (VMs) 304 to operate. Each VM 304 may have a VM type that indicates its functionality or role. For example, FIG. 3 illustrates a MCM VM 304a, an ASM VM 304b, and a DEP VM 304c. Additionally or alternatively, VMs 304 may include other types of VMs. Each VM 304 may consume various network resources from a hardware platform 306, such as a resource 308, a virtual central processing unit (vCPU) 308a, memory 308b, or a network interface card (NIC) 308c. Additionally or alternatively, hardware platform 306 may include other types of resources 308.

While FIG. 3 illustrates resources 308 as collectively contained in hardware platform 306, the configuration of hardware platform 306 may isolate, for example, certain memory 308c from other memory 108c.

Hardware platform 306 may comprise one or more chasses 310. Chassis 310 may refer to the physical housing or platform for multiple servers or other network equipment. In an aspect, chassis 310 may also refer to the underlying network equipment. Chassis 310 may include one or more servers 312. Server 312 may comprise general purpose computer hardware or a computer. In an aspect, chassis 310 may comprise a metal rack, and servers 312 of chassis 310 may comprise blade servers that are physically mounted in or on chassis 310.

Each server 312 may include one or more network resources 308, as illustrated. Servers 312 may be communicatively coupled together (not shown) in any combination or arrangement. For example, all servers 312 within a given chassis 310 may be communicatively coupled. As another example, servers 312 in different chasses 310 may be communicatively coupled. Additionally or alternatively, chasses 310 may be communicatively coupled together (not shown) in any combination or arrangement.

The characteristics of each chassis 310 and each server 312 may differ. The type or number of resources 310 within each server 312 may vary. In an aspect, chassis 310 may be used to group servers 312 with the same resource characteristics. In another aspect, servers 312 within the same chassis 310 may have different resource characteristics.

Given hardware platform 306, the number of sessions that may be instantiated may vary depending upon how efficiently resources 308 are assigned to different VMs 304. For example, assignment of VMs 304 to particular resources 308 may be constrained by one or more rules. For example, a first rule may require that resources 308 assigned to a particular VM 304 be on the same server 312 or set of servers 312. For example, if VM 304 uses eight vCPUs 308a, 1 GB of memory 308b, and 2 NICs 308c, the rules may require that all of these resources 308 be sourced from the same server 312. Additionally or alternatively, VM 304 may require splitting resources 308 among multiple servers 312, but such splitting may need to conform with certain restrictions. For example, resources 308 for VM 304 may be able to be split between two servers 312. Default rules may apply. For example, a default rule may require that all resources 308 for a given VM 304 must come from the same server 312.

An affinity rule may restrict assignment of resources 308 for a particular VM 304 (or a particular type of VM 304). For example, an affinity rule may require that certain VMs 304 be instantiated on (e.g., consume resources from) the same server 312 or chassis 310. For example, if VNF 302 uses six MCM VMs 304a, an affinity rule may dictate that those six MCM VMs 304a be instantiated on the same server 312 (or chassis 310). As another example, if VNF 302 uses MCM VMs 304a, ASM VMs 304b, and a third type of VMs 304, an affinity rule may dictate that at least the MCM VMs 304a and the ASM VMs 304b be instantiated on the same server 312 (or chassis 310). Affinity rules may restrict assignment of resources 308 based on the identity or type of resource 308, VNF 302, VM 304, chassis 310, server 312, or any combination thereof.

An anti-affinity rule may restrict assignment of resources 308 for a particular VM 304 (or a particular type of VM 304). In contrast to an affinity rule—which may require that certain VMs 304 be instantiated on the same server 312 or chassis 310—an anti-affinity rule requires that certain VMs 304 be instantiated on different servers 312 (or different chasses 310). For example, an anti-affinity rule may require that MCM VM 304a be instantiated on a particular server 312 that does not contain any ASM VMs 304b. As another example, an anti-affinity rule may require that MCM VMs 304a for a first VNF 302 be instantiated on a different server 312 (or chassis 310) than MCM VMs 304a for a second VNF 302. Anti-affinity rules may restrict assignment of resources 308 based on the identity or type of resource 308, VNF 302, VM 304, chassis 310, server 312, or any combination thereof.

Within these constraints, resources 308 of hardware platform 306 may be assigned to be used to instantiate VMs 304, which in turn may be used to instantiate VNFs 302, which in turn may be used to establish sessions. The different combinations for how such resources 308 may be assigned may vary in complexity and efficiency. For example, different assignments may have different limits of the number of sessions that can be established given a particular hardware platform 306.

For example, consider a session that may require gateway VNF 302a and PCRF VNF 302b. Gateway VNF 302a may require five VMs 304 instantiated on the same server 312, and PCRF VNF 302b may require two VMs 304 instantiated on the same server 312. (Assume, for this example, that no affinity or anti-affinity rules restrict whether VMs 304 for PCRF VNF 302b may or must be instantiated on the same or different server 312 than VMs 304 for gateway VNF 302a.) In this example, each of two servers 312 may have sufficient resources 308 to support 10 VMs 304. To implement sessions using these two servers 312, first server 312 may be instantiated with 10 VMs 304 to support two instantiations of gateway VNF 302a, and second server 312 may be instantiated with 9 VMs: five VMs 304 to support one instantiation of gateway VNF 302a and four VMs 304 to support two instantiations of PCRF VNF 302b. This may leave the remaining resources 308 that could have supported the tenth VM 304 on second server 312 unused (and unusable for an instantiation of either a gateway VNF 302a or a PCRF VNF 302b). Alternatively, first server 312 may be instantiated with 10 VMs 304 for two instantiations of gateway VNF 302a and second server 312 may be instantiated with 10 VMs 304 for five instantiations of PCRF VNF 302b, using all available resources 308 to maximize the number of VMs 304 instantiated.

Consider, further, how many sessions each gateway VNF 302a and each PCRF VNF 302b may support. This may factor into which assignment of resources 308 is more efficient. For example, consider if each gateway VNF 302a supports two million sessions, and if each PCRF VNF 302b supports three million sessions. For the first configuration—three total gateway VNFs 302a (which satisfy the gateway requirement for six million sessions) and two total PCRF VNFs 302b (which satisfy the PCRF requirement for six million sessions)—would support a total of six million sessions. For the second configuration-two total gateway VNFs 302a (which satisfy the gateway requirement for four million sessions) and five total PCRF VNFs 302b (which satisfy the PCRF requirement for 15 million sessions)—would support a total of four million sessions. Thus, while the first configuration may seem less efficient looking only at the number of available resources 308 used (as resources 308 for the tenth possible VM 304 are unused), the second configuration is actually more efficient from the perspective of being the configuration that can support more the greater number of sessions.

To solve the problem of determining a capacity (or, number of sessions) that can be supported by a given hardware platform 305, a given requirement for VNFs 302 to support a session, a capacity for the number of sessions each VNF 302 (e.g., of a certain type) can support, a given requirement for VMs 304 for each VNF 302 (e.g., of a certain type), a given requirement for resources 308 to support each VM 304 (e.g., of a certain type), rules dictating the assignment of resources 308 to one or more VMs 304 (e.g., affinity and anti-affinity rules), the chasses 310 and servers 312 of hardware platform 306, and the individual resources 308 of each chassis 310 or server 312 (e.g., of a certain type), an integer programming problem may be formulated.

First, a plurality of index sets may be established. For example, index set L may include the set of chasses 310. For example, if a system allows up to 6 chasses 310, this set may be:

L={1, 2, 3, 4, 5, 6},
where l is an element of L.

Another index set J may include the set of servers 312. For example, if a system allows up to 16 servers 312 per chassis 310, this set may be:

J={1, 2, 3, . . . , 16},
where j is an element of J.

As another example, index set K having at least one element k may include the set of VNFs 302 that may be considered. For example, this index set may include all types of VNFs 302 that may be used to instantiate a service. For example, let K={GW, PCRF}
where GW represents gateway VNFs 302*a* and PCRF represents PCRF VNFs 302*b*.

Another index set I(k) may equal the set of VMs 304 for a VNF 302 *k*. Thus, let I(GW)={MCM, ASM, IOM, WSM, CCM, DCM}
represent VMs 304 for gateway VNF 302*a*, where MCM represents MCM VM 304*a*, ASM represents ASM VM 304*b*, and each of IOM, WSM, CCM, and DCM represents a respective type of VM 304. Further, let I(PCRF)={DEP, DIR, POL, SES, MAN}
represent VMs 304 for PCRF VNF 302*b*, where DEP represents DEP VM 304*c* and each of DIR, POL, SES, and MAN represent a respective type of VM 304.

Another index set V may include the set of possible instances of a given VM 304. For example, if a system allows up to 20 instances of VMs 302, this set may be:

V={1, 2, 3, . . . , 20},
where v is an element of V.

In addition to the sets, the integer programming problem may include additional data. The characteristics of VNFs 302, VMs 304, chasses 310, or servers 312 may be factored into the problem. This data may be referred to as parameters. For example, for given VNF 302 *k*, the number of sessions that VNF 302 *k* can support may be defined as a function S(k). In an aspect, for an element k of set K, this parameter may be represented by S(k)>=0;
is a measurement of the number of sessions k can support. Returning to the earlier example where gateway VNF 302*a* may support 2 million sessions, then this parameter may be S(GW)=2,000,000.

VM 304 modularity may be another parameter in the integer programming problem. VM 304 modularity may represent the VM 304 requirement for a type of VNF 302. For example, for k that is an element of set K and i that is an element of set I, each instance of VNF k may require M(k, i) instances of VMs 304. For example, recall the example where

I(GW)={MCM, ASM, IOM, WSM, CCM, DCM}.

In an example, M(GW, I(GW)) may be the set that indicates the number of each type of VM 304 that may be required to instantiate gateway VNF 302*a*. For example, M(GW, I(GW))={2, 16, 4, 4, 2, 4}
may indicate that one instantiation of gateway VNF 302*a* may require two instantiations of MCM VMs 304*a*, 16 instantiations of ACM VM 304*b*, four instantiations of IOM VM 304, four instantiations of WSM VM 304, two instantiations of CCM VM 304, and four instantiations of DCM VM 304.

Another parameter may indicate the capacity of hardware platform 306. For example, a parameter C may indicate the number of vCPUs 308*a* required for each VM 304 type i and for each VNF 302 type k. For example, this may include the parameter C(k, i).

For example, if MCM VM 304*a* for gateway VNF 302*a* requires 20 vCPUs 308*a*, this may be represented as C(GW, MCM)=20.

However, given the complexity of the integer programming problem—the numerous variables and restrictions that must be satisfied—implementing an algorithm that may be used to solve the integer programming problem efficiently, without sacrificing optimality, may be difficult.

Figure 4:
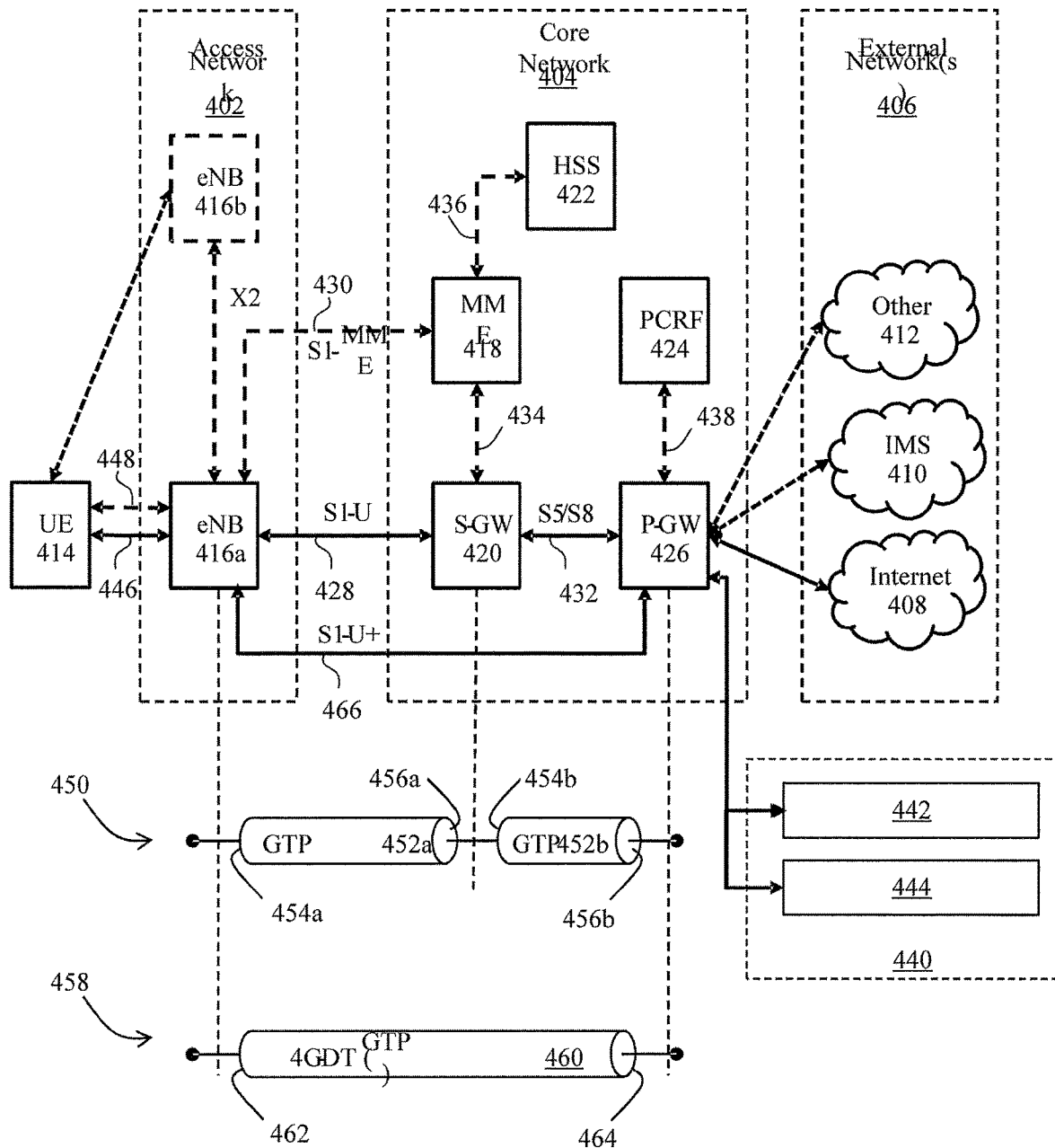
FIG. 4 depicts an example communication system that provides wireless telecommunication services over wireless communication networks.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with a network.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416*a*, 416*b*. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from a peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring and/or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively, or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416*a*, a second portion (e.g., an S1 data bearer 428) between eNB 416*a* and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416*a*, and a second signaling portion (e.g., S1 signaling bearer 430) between eNB 416*a* and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of a network herein, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452*a* between two tunnel endpoints 454*a* and 456*a*, and a second tunnel 452*b* between two tunnel endpoints 454*b* and 456*b*. In the illustrative example, first tunnel 452*a* is established between eNB 416*a* and SGW 420. Accordingly, first tunnel 452*a* includes a first tunnel endpoint 454*a* corresponding to an S1-U address of eNB 416*a* (referred to herein as the eNB S1-U address), and second tunnel endpoint 456*a* corresponding to an S1-U address of SGW 420 (referred to herein as the SGW S1-U address). Likewise, second tunnel 452*b* includes first tunnel endpoint 454*b* corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
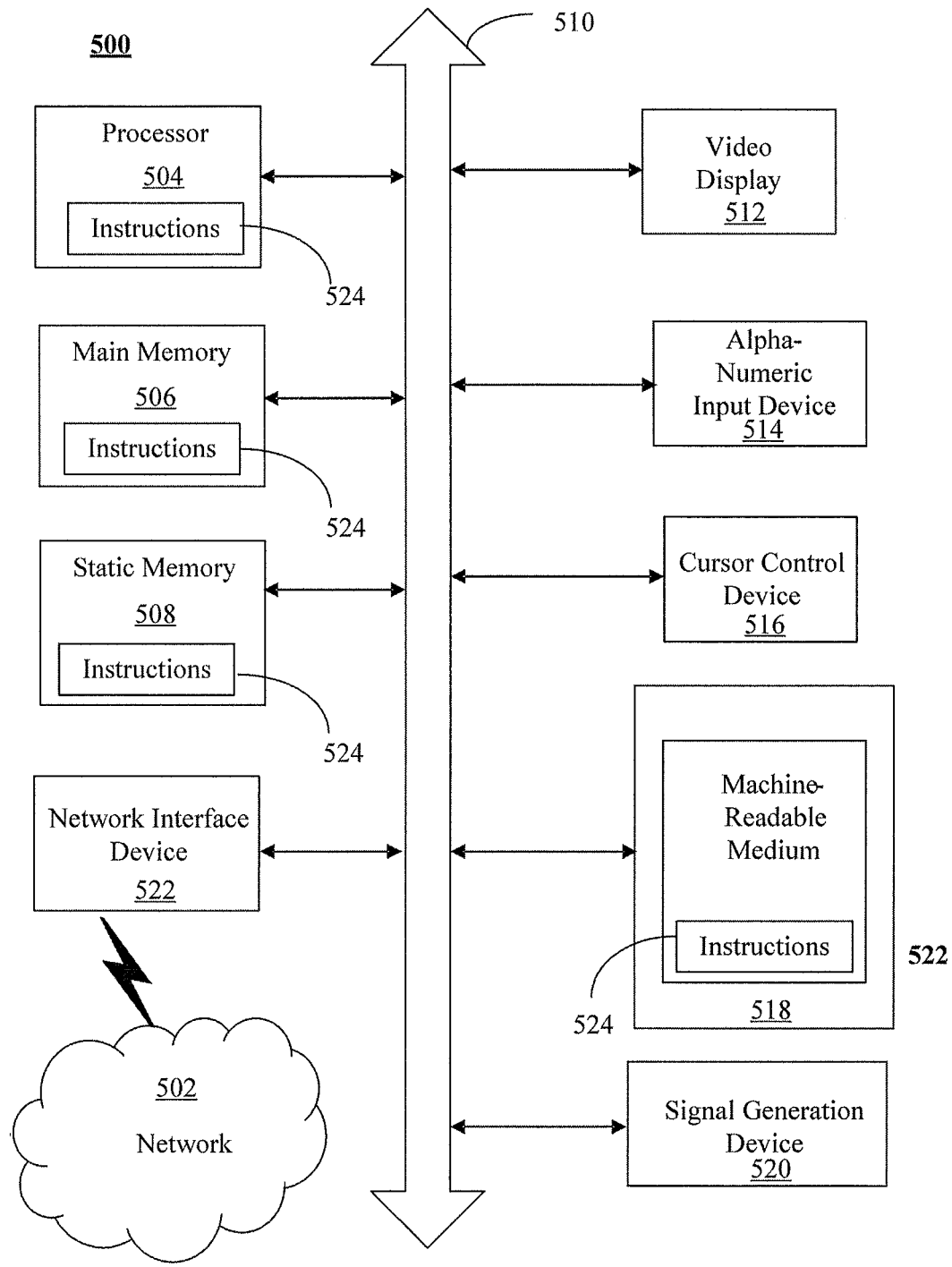
FIG. 5 depicts an example communication system that provides wireless telecommunication services over wireless communication networks.

FIG. 5 depicts an example diagrammatic representation of a machine in the form of a computer system 500 within which a set of instructions, when executed, may cause the machine to perform any one or more of the methods described above. One or more instances of the machine can operate, for example, as a processor, UE 414, eNB 416, MME 418, SGW 420, HSS 422, PCRF 424, PGW 426 and other devices described herein. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
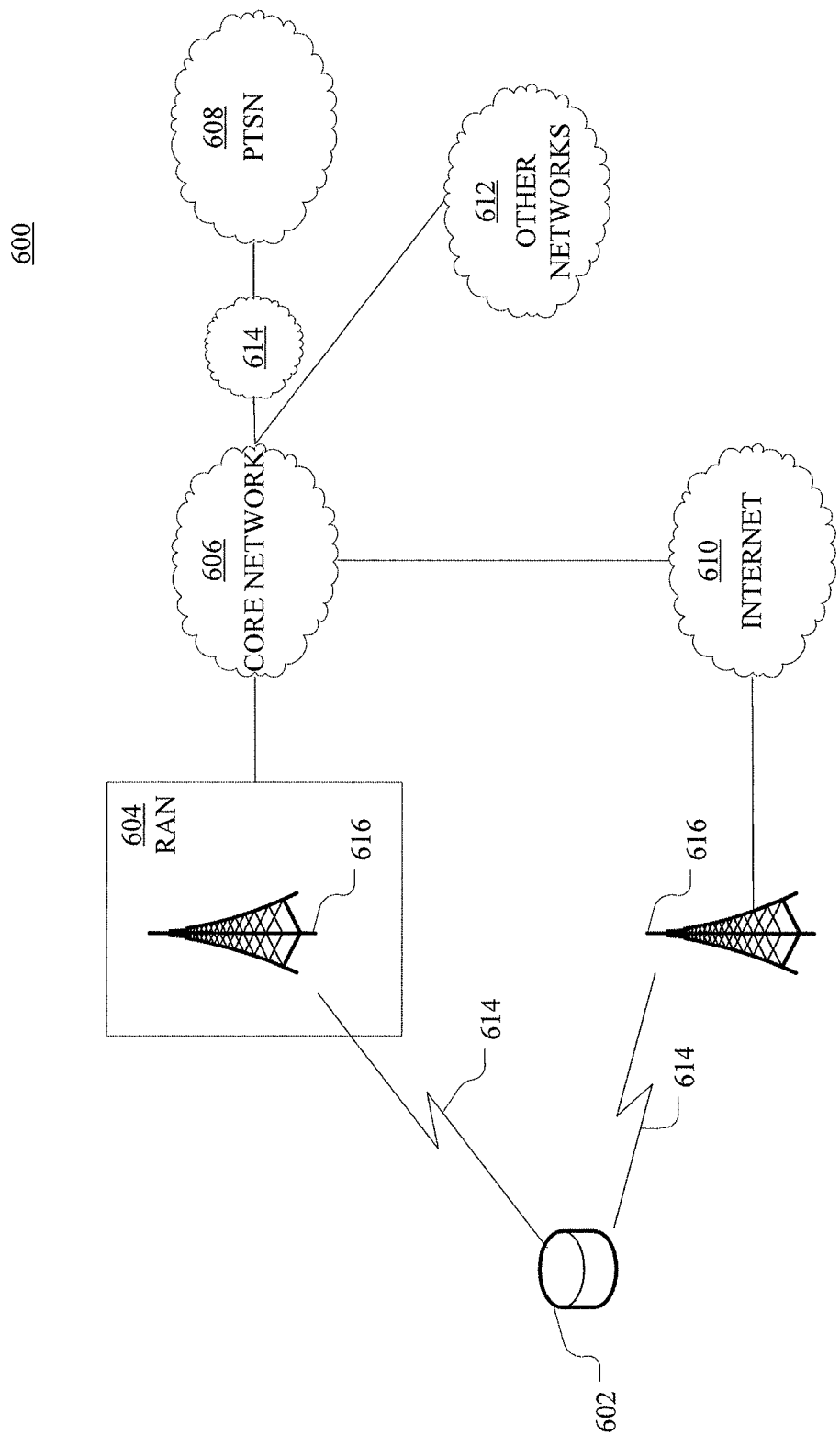
FIG. 6 is a diagram of an example telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, a network device, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 IX, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
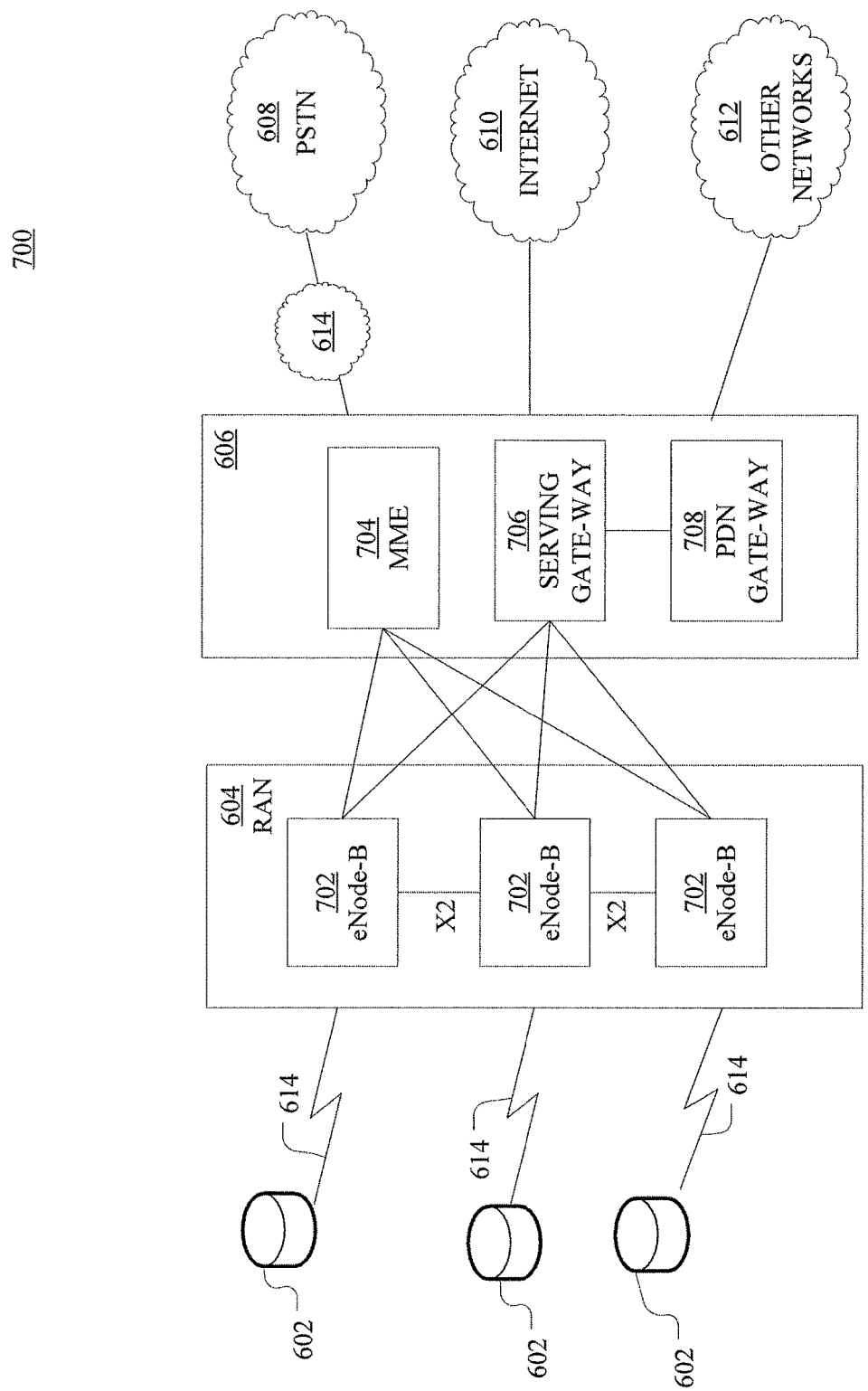
FIG. 7 is an example system diagram of a radio access network and a core network.

FIG. 7 is an example system 100 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
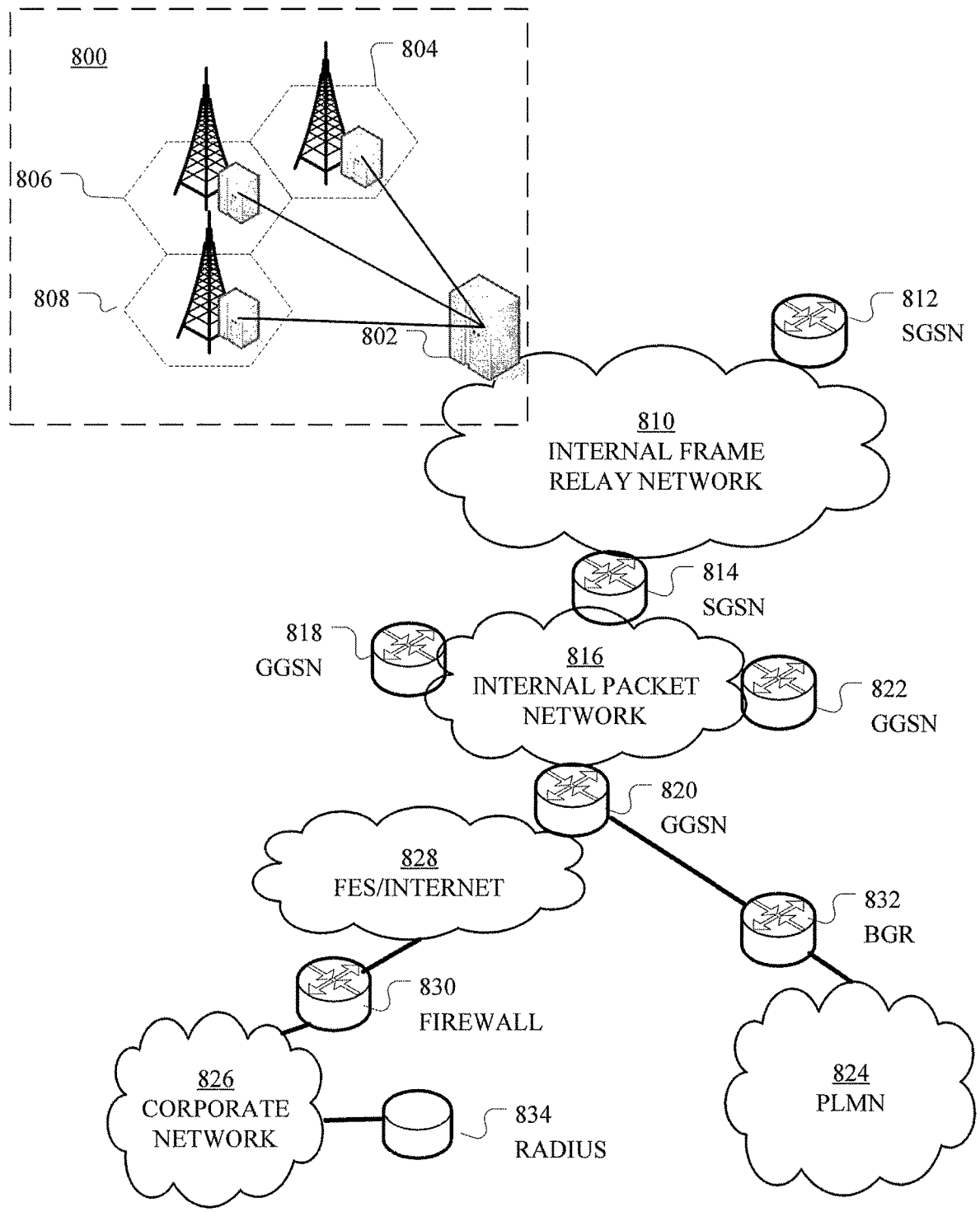
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
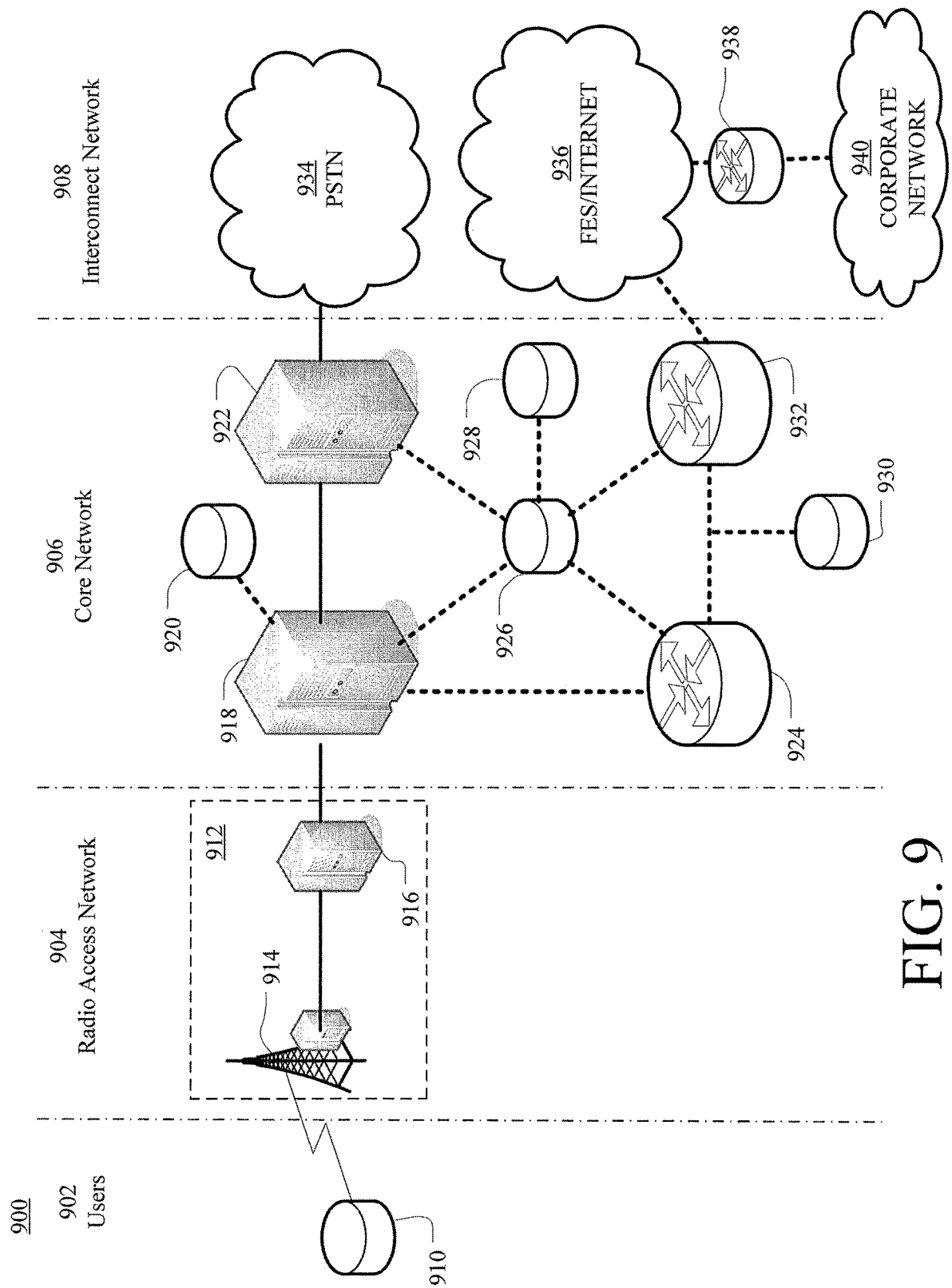
FIG. 9 illustrates an example architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., a mobile device, a mobile positioning center, a network device, a detected device, or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
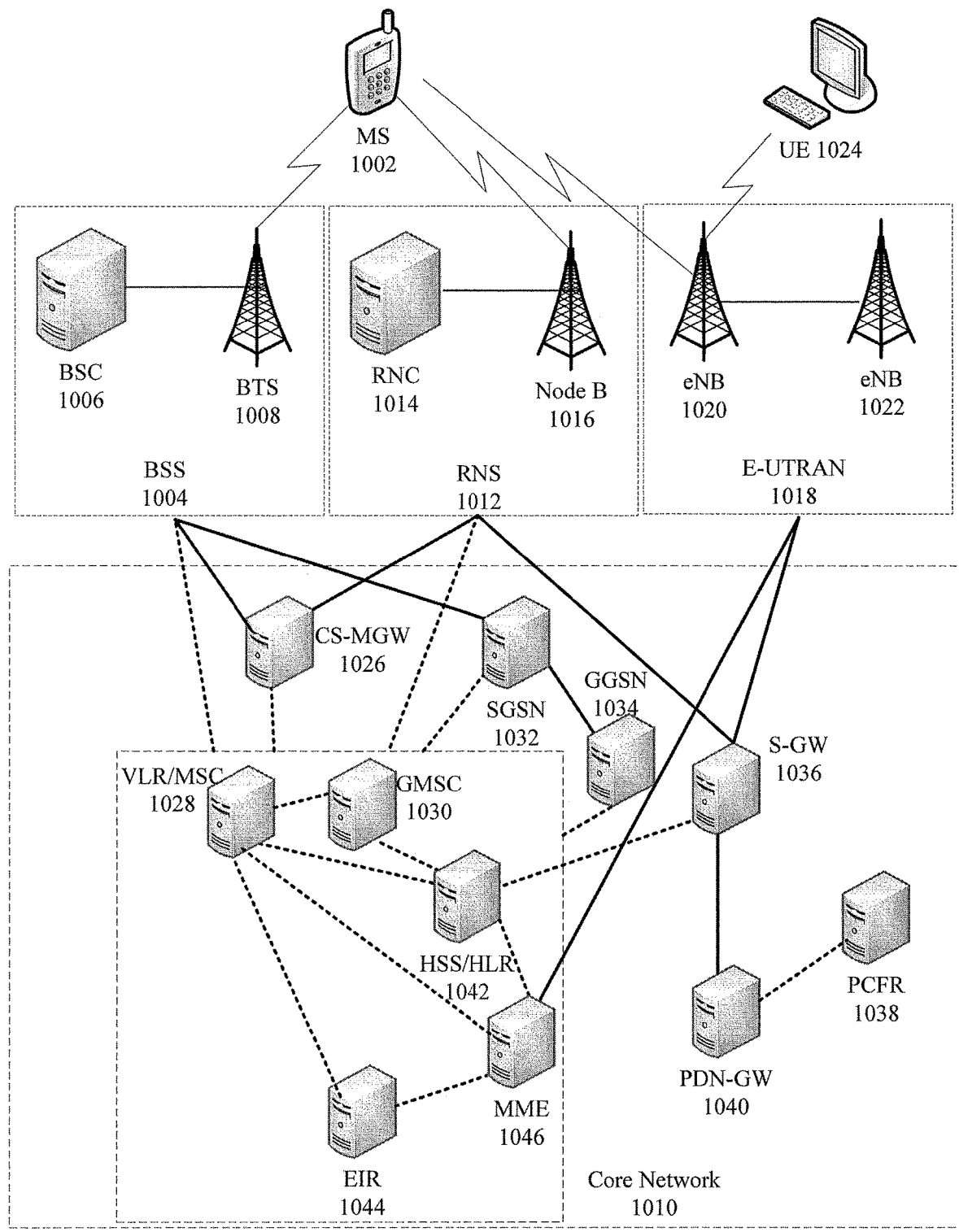
FIG. 10 is a block diagram of an example public land mobile network (PLMN).

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, a network device or other electronic system, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life-especially for simple M2M devices-through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

What is claimed is:

1. A system, comprising:
   an access point communication module configured to communicate with a plurality of access points, wherein each of the plurality of access points is configured to communicate with one or more user devices;
   a shared access communication module configured to communicate with a radio access network element, a shared access processing module, and the access point communication module, wherein the radio access network element is configurable to operate on a carrier frequency and a different frequency associated with a shared spectrum, wherein the shared access communication module is configured to provide shared access system data comprising spectrum frequency changes between the carrier frequency and the different frequency to the access point communication module, wherein the system is further configured to generate a change trend in the shared access system data according to analysis of a log of the shared access system data, to predict future changes to the shared access system data according to the change trend, and to track a capacity and a utilization of at least one access point of the plurality of access points, wherein the change trend to the shared access system data describes dedicated resources made conditionally available when not utilized by an incumbent user, wherein the shared access processing module is in communication with the access point communication module and is configured to transmit, through the access point communication module to the at least one access point of the plurality of access points, an access point command based on the shared access system data in response to determining that the at least one access point is impacted by the change trend in the shared access system data and the future changes to the shared access system data based on operating parameters of the at least one access point and based on available frequency bands, wherein the at least one access point is a virtualized access point instance, wherein the access point command comprises instructions for destroying the virtualized access point instance and creating another virtualized access point based on the change trend in the shared access system data, and wherein the virtualized access point instance is configured to operate based on the change trend in the shared access system data.

2. The system of claim 1, wherein the analysis of a log of the shared access system data can include analyzing network conditions, contextual information, or a combination thereof.

3. The system of claim 2, wherein the contextual information can include network traffic, time of day, maintenance, or any combination thereof.

4. The system of claim 1, wherein the access point command further instructs a frequency change to comply with the shared access system data.

5. A method, comprising:
receiving changes to shared access system data from a radio access network element by an access point communication module in communication with a plurality of access points, wherein each of the plurality of access points is configured to communicate with one or more user devices, wherein the radio access network element is in communication with a shared access communication module, wherein the changes to the shared access system data comprise spectrum frequency changes between a carrier frequency and a different frequency associated with a shared access spectrum, and wherein the changes comprise switching between the carrier frequency and the different frequency;
receiving, by the access point communication module, future changes to the shared access system data, wherein the future changes are predicted based on a change trend in the shared access system data generated based on analysis of a log of the shared access system data, wherein the change trend describes dedicated resources made conditionally available when not utilized by an incumbent user;
tracking, by the access point communication module, capacity and utilization of at least one access point of the plurality of access points;
determining, by the access point communication module, that at least one access point of the plurality of access points is impacted by the change trend in the shared access system data and the future changes to the shared access system data based on operating parameters of the at least one access point and based on available frequency bands; and
in response to determining that the at least one access point is impacted by the change trend and the future changes to the shared access system data, modifying, by the access point communication module, the at least one access point via an access point command, wherein the at least one access point is a virtualized access point instance, wherein the access point command comprises instructions for destroying the virtualized access point instance and creating another virtualized access point based on the change trend in the shared access system data, and wherein the virtualized access point instance is configured to operate based on the change trend in the shared access system data.

6. The method of claim 5, wherein the analysis of a log of the shared access system data can include analyzing network conditions.

7. The method of claim 6, wherein the analysis of a log of the shared access system data can include analyzing contextual information.

8. The method of claim 7, wherein the contextual information can include network traffic.

9. The method of claim 7, wherein the contextual information can include time of day.

10. The method of claim 7, wherein the contextual information can include maintenance information.

11. A system, comprising a non-transitory computer-readable medium storing instructions that when executed by a processor effectuate operations comprising:
receiving changes to shared access system data from a radio access network element by an access point communication module in communication with a plurality of access points, wherein each of the plurality of access points is configured to communicate with one or more user devices, wherein the radio access network element is in communication with a shared access communication module, wherein the shared access system data comprises spectrum frequency changes between a carrier frequency and a different frequency associated with a shared access spectrum and the changes comprise switching between the carrier frequency and the different frequency;
receiving future changes to the shared access system data, wherein the future changes are predicted based on a change trend in the shared access system data generated based on analysis of a log of the shared access system data, wherein the change trend describes dedicated resources made conditionally available when not utilized by an incumbent user;
tracking capacity and utilization of at least one access point of the plurality of access points;
determining that the at least one access point of the plurality of access points is impacted by the change trend in the shared access system data and the future changes to the shared access system data based on available frequency bands;
in response to determining that the at least one access point is impacted by the change trend and the future changes to the shared access system data, generating an access point command based on the change trend in the shared access system data; and
transmitting the access point command to the at least one access point, wherein the at least one access point is a virtualized access point instance, wherein the access point command comprises instructions for destroying the virtualized access point instance and creating another virtualized access point based on the change trend in the shared access system data, and wherein the virtualized access point instance is configured to operate based on the change trend in the shared access system data.

12. The system of claim 11, wherein the analysis of a log of the shared access system data can include analyzing network conditions.

13. The system of claim 12, wherein the analysis of a log of the shared access system data can include analyzing contextual information.

14. The system of claim 13, wherein the contextual information can include network traffic.

15. The system of claim 13, wherein the contextual information can include time of day.

16. The system of claim 11, wherein the operations further comprise: providing an interface to one or more of a non-virtualized access point, an antenna, a radio head, and a connectivity element.

17. The system of claim 13, wherein the contextual information can include maintenance information.

* * * * *